UNITED STATES PATENT OFFICE.

WOLDEMAR SCHÜTZE, OF BERLIN, GERMANY.

PROCESS OF PREVENTING THE DEGENERATION OF COTTON-SHRUBS.

1,008,738. Specification of Letters Patent. Patented Nov. 14, 1911.

No Drawing. Application filed June 22, 1911. Serial No. 634,809.

*To all whom it may concern:*

Be it known that I, WOLDEMAR SCHÜTZE, a subject of the German Emperor, and residing at Berlin, Germany, have invented a certain new and useful Improved Process of Preventing the Degeneration of Cotton-Shrubs, of which the following is a specification.

The subject-matter of my invention is a process for preventing the degeneration of cotton-shrubs.

It is well-known that cotton-plants degenerate in a relatively short time and become unproductive, so that it is constantly necessary to produce new plants by sowing the seed of the cotton-shrubs.

Now a primary object of my invention is to provide a process which in a very simple manner prevents this degeneration of cotton-shrubs and causes the cotton-shrubs to provide uniform harvests for a considerably greater number of years than has heretofore been the case.

My process consists in planting the seed of a mother-plant, which has proved to be the bearer of a good cotton, in suitable manner so that plants develop from this seed. As soon as these plants have grown to such an extent that they admit of being grafted, they are headed, and slips from the mother-plant which is known to be reliable are then grafted on these headed plants. When the plants thus grafted have developed so that a number of new branches suitable for grafting have grown, these shoots are used for grafting the cotton-shrubs which are to be protected from degeneration and which are then likewise suitably headed. Preferably one shoot is grafted onto each plant. Owing to this grafting, on the one hand the degeneration of the grafted plants is prevented, and, on the other hand, a cotton-shrub is produced which supplies uniform harvests for a considerable number of years, the kind and quality of the cotton produced being equal to that of the original approved mother-plant. Additional shoots can then be taken from these plants thus produced.

It is to be understood that wild plants can be treated according to the present process.

If it is wished to carry the process into practice in the manner heretofore universally employed in the culture of such plants by using other plants, not grown from the seed of the mother-plant, as the intermediate plants which are grafted by the mother-plant and are to supply the shoots for protecting against degeneration, the end in view cannot be obtained with certainty in this way. Complete success is certainly obtained only when such plants are taken as intermediate plants as are grown from the seed of the mother-plant supplying the shoots for grafting, because in this manner the productive quality of the plant is so fixed by origin and ingrafting that it certainly proves effectual when further grafting takes place.

When speaking of cotton shrubs I do not limit my invention to any particular species of cotton shrubs, and in my claim I intend the words "cotton shrubs" to cover all species of the cotton family to which the process is applicable.

I claim:—

The hereindescribed process of preventing the degeneration of cotton-shrubs, which consists in growing new plants from the seed of a productive mother-plant, in heading the new plants after they have sufficiently developed and grafting them with shoots from the said mother-plant, in then cutting shoots from the sufficiently developed grafted plants, and in grafting cotton-plants with the shoots.

In testimony whereof, I affix my signature in the presence of two witnesses.

WOLDEMAR SCHÜTZE.

Witnesses:
 WOLDEMAR HAUPT,
 HENRY HASPER.

Copies of this patent may be obtained for five cents each, by addressing the "Commissioner of Patents, Washington, D. C."